Sept. 6, 1960  J. HEILFRON  2,951,296
DISCRETE-VARIABLE ELECTRONIC TRAFFIC SIMULATOR
Filed March 23, 1956  5 Sheets-Sheet 1

JACQUES HEILFRON,
INVENTOR.
HUEBNER, BEEHLER,
WORREL & HERZIG,
ATTORNEYS
BY
Albert M. Herzig

JACQUES HEILFRON,
INVENTOR.
HUEBNER, BEEHLER,
WORREL & HERZIG,
ATTORNEYS.
BY

JACQUES HEILFRON,
INVENTOR.
HUEBNER, BEEHLER,
WORREL & HERZIG,
ATTORNEYS.
BY

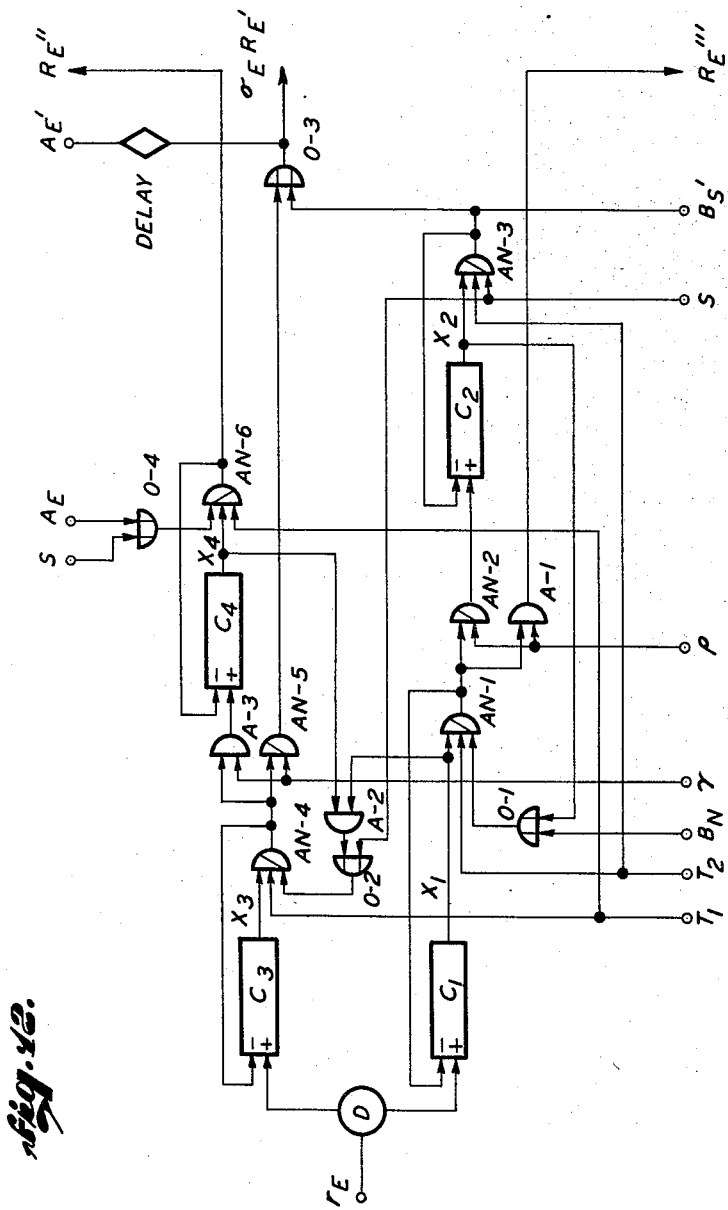

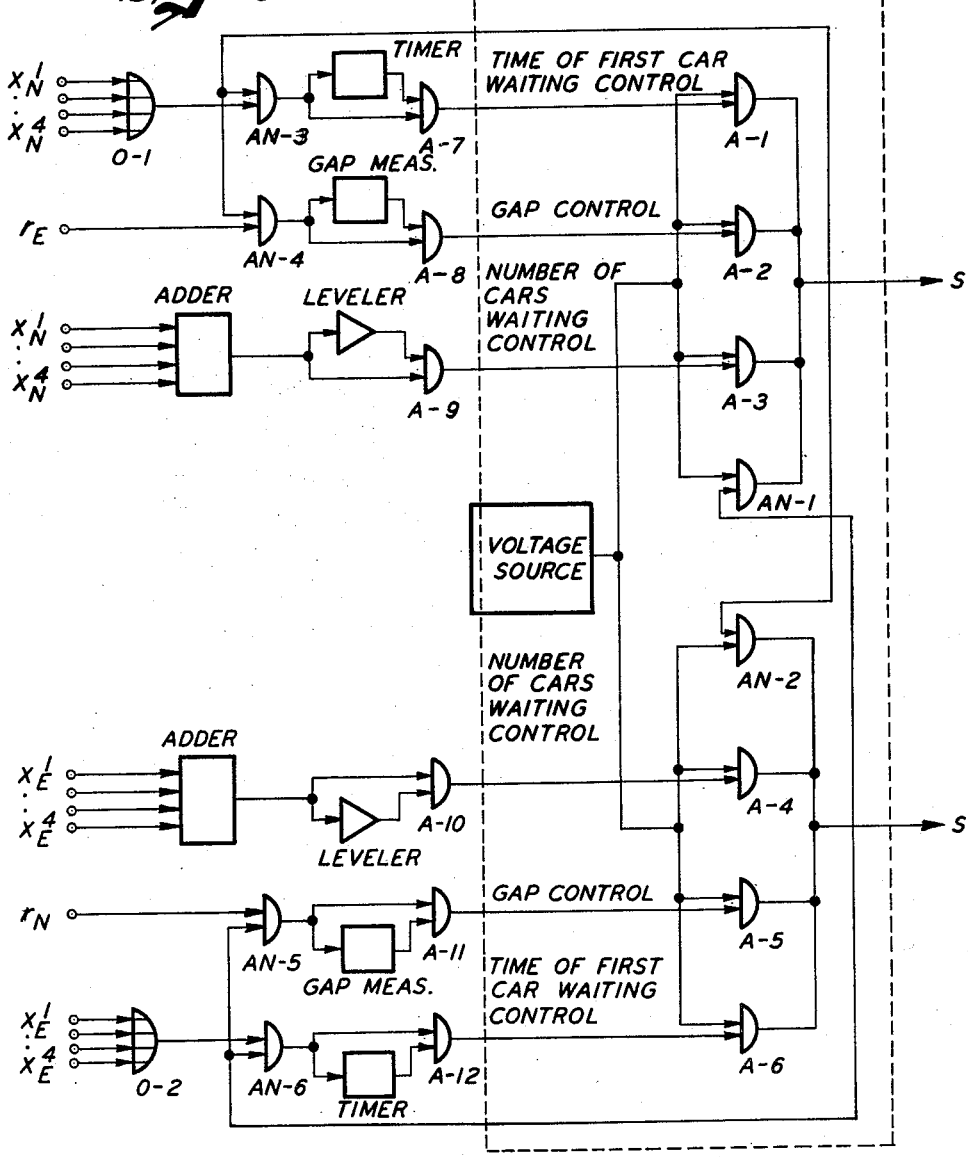

United States Patent Office 2,951,296
Patented Sept. 6, 1960

2,951,296

DISCRETE-VARIABLE ELECTRONIC TRAFFIC SIMULATOR

Jacques Heilfron, Los Angeles, Calif., assignor to The Regents of the University of California, Berkeley, Calif., a corporation Filed Mar. 23, 1956, Ser. No. 573,513

8 Claims. (Cl. 35—10.2)

This invention relates to an electronic device for the simulation of traffic conditions at street intersections produced by vehicles and pedestrians, and in particular to a special-purpose electronic device suitable for the study of traffic-flow problems by means of discrete-variable representation.

By a discrete-variable is meant a variable which takes on at most a countable number of distinct values as distinguished from a continuous variable which takes on a continuum of possible values.

A satisfactory traffic simulator should be capable of operation on a constant time scale regardless of the complexity of the traffic problem and should comprise various components which can be interconnected to give a representation of a traffic system of arbitrary complexity. The traffic simulator should be flexible for the purpose of studying such practical problems as the effects of the time of the red period plus the green period of a traffic signal, the time delay between cycles of two traffic signals, blocking of portions of streets, forbidding left turns at intersections, and similar conditions for various rates of traffic.

The problem of constructing a satisfactory traffic simulator divides itself naturally into the design of components representing intersections, sections of streets connecting intersections, control equipment including such items as traffic signal generators, decision makers for deciding which cars are to turn, etc., input-output equipment corresponding to traffic sources and sinks, and metering equipment to measure the degree of efficiency of operation of the traffic system in relation to a chosen criterion.

Accordingly, it is an important object of this invention to provide a traffic simulator capable of operation on a constant time scale in connection with the simulation and study of extremely complex traffic problems.

A further object is to provide a traffic simulator made up of various components designed to be interconnected to simulate traffic conditions brought about by various complicating factors found in an actual traffic system.

Another object is to provide a traffic simulator having a high degree of flexibility for studying the effect on traffic flow of such widely different factors as traffic signal characteristics, traffic lane stoppages, left and right turns at intersections and pedestrian interference.

Additional objects will become apparent from the following description of a specific embodiment of the invention which is given below with reference to the drawings, wherein.

Figure 8A:
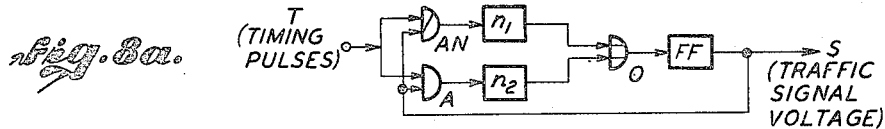
Figure 8(a) is a diagrammatic representation of a traffic light signal generator for a street intersection traffic simulator.
Figure 8B:

Figure 8(b) diagrammatically illustrates a variation of the signal generator shown in Figure 8(a).

Figure 9:
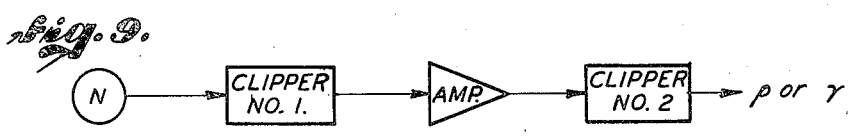
Figure 10:
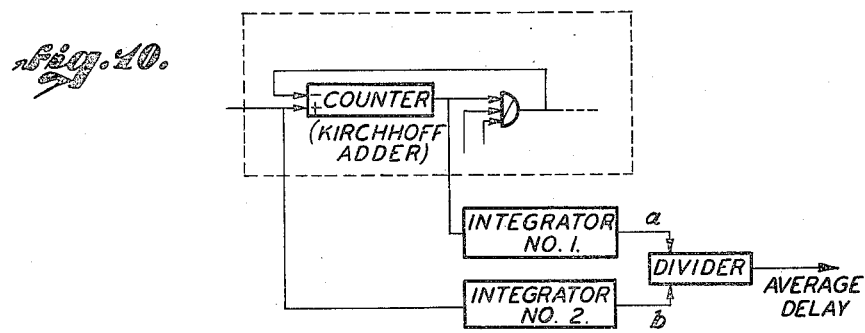
Figure 11:
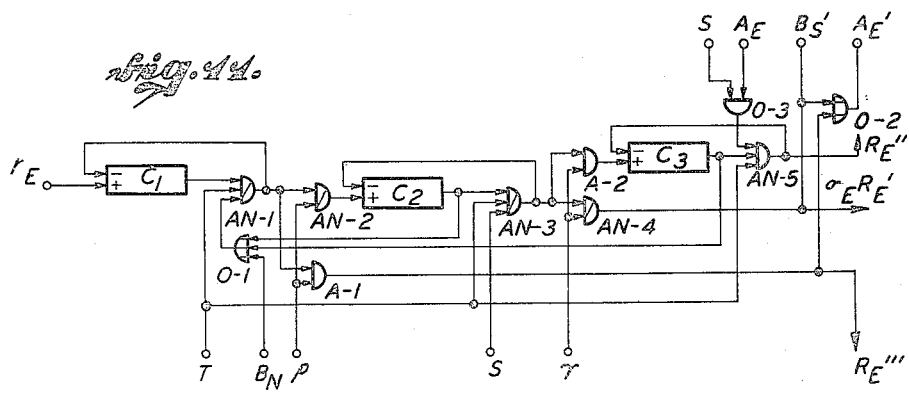

Figure 9 is a diagrammatic representation of a noise generator for a street intersection traffic simulator;

Figure 10 is a diagrammatic representation of a device for measuring the average waiting time per vehicle in a street intersection traffic system;

Figure 11 is a circuit diagram representing one portion of an intersection of two two-lane streets at which right turns on a red and also left turns (during green) are permitted;

Figure 12 is a similar diagram for one direction of a multilane intersection; and Figure 13 diagrammatically shows a complete logical design of a high speed digital traffic controller, including both controlling signal processor and switching circuit.

For this particular simulator, a pulse-vehicle correspondence was decided upon. This results in the simulator being a type of special purpose digital computer. Most of the design is carried out using symbols denoting the logical operations of "And," "Or," and "Not" (complement) and the corresponding devices called "gates" which perform these operations. The symbolism is by no means standard. The symbols defined below have been used:

| Symbol | Name | Description |
|---|---|---|
| A | And Gate | Voltage at output if and only if signals at *all* inputs. |
| O | Or Gate | Voltage at output if and only if a signal at *at least one* input. |
| AN | And-Not Gate. | Voltage at output if and only if signals at *all inputs* except the one marked by a slash |
| ∓ C | Counter | Voltage at output if and only if the number of pulses into the (+) input exceeds the number into the (−) input. |

In order to limit the complexity of the simulator, the following postulates are made:

(a) Each pulse represents one car.
(b) Pulses can occur only at predetermined discrete time instances at the output of each intersection.
(c) Amber periods are included in the green of the traffic signal cycle.
(d) Any delay due to starting or stopping at intersections will be added to the delay caused by the adjoining sections of streets.
(e) All cars travel at the same speed.

In regard to the above postulates, (a) needs no comment. Postulate (b) is made in order to control the maximum rate at which vehicles may pass a fixed point. It implies that there is some minimum time spacing between vehicles and only spacings which are multiples of the minimum are permitted. This is certainly not true in general but it is felt that no appreciable error is introduced if "on the average" type results are desired. The same is true of postulates (c) and (d). In (c) the necessity for a decision maker during amber periods has been eliminated. Postulate (e) was made to eliminate the complex problem of passing, thus making the street components delay lines with delay equal to the length of the street section divided by the speed of vehicles plus the constant delay due to postulate (d). This postulate is not so unreasonable during very congested conditions (the type of situations necessitating this invention).

It is not meant to imply that these particular idealizations are necessary. Because of the tremendous versatility of digital computers, any consistent set of postulates may be made, limited only by the complexity of the resulting device one is willing to accept.

Postulate (e) implies that the street component is a delay line. Pulses corresponding to cars leaving one intersection in a particular direction are fed into the delay line and emerge at a later time corresponding to the time the vehicles arrive at the next intersection. This could well be done by using a magnetic drum with fixed read-in heads and moveable read-out heads, each of which may be adjusted to give the desired amount of delay for the street section represented. A few additional complications arise if one is dealing with a multi-lane street where lane changing (but still no passing) is permitted. This will be discussed below in connection with a discussion of multi-lane intersection components.

At this point will be discussed the simpler design of intersection components representing the intersection of streets with one lane each way.

Logically, one can state the following for an intersection:

(1) Vehicles make turns in accordance with a priori information, i.e., the percentage of vehicles making a given turn is not a function of any of the flow behavior on the grid of traffic intersections. This is a basic postulate and can be viewed as a phenomenon of the intersection rather than of the over all grid. This might be a deduction from an over all postulate such as, "Vehicles move so as to achieve maximum freedom of action or so as to minimize delay." A model following this turn postulate can yield no route information.

(2) Vehicles are conserved. On the average, as many leave an intersection as enter.

(3) When the traffic signal is red, vehicles go into storage, bunch and wait.

(4) When the traffic signal is green vehicles in storage are released at a prescribed rate dependent upon interferences.

(5) When the traffic signal is green, arriving vehicles go into storage if others are waiting, otherwise they pass through the intersection at a rate dependent upon interferences.

Figure 1:
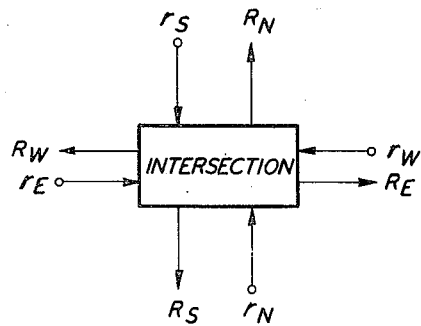
Figure 1 is a diagram illustrating a broad characterization for two intersecting streets.

The intersection can be considered as a system with certain "inputs" and certain "outputs" related to traffic flow. Such flow is in terms of vehicles waiting on red, turning on green, and meeting certain types of interference due to opposing vehicles or pedestrian traffic. Figure 1 illustrates a broad characterization for two intersecting streets. For convenience in notation the layout of the streets is oriented such that traffic flow is in the directions of east, west, north and south. The input variable of traffic flow to the intersection is represented by the lower case letter $r$ with appropriate subscript indicating the direction, and the output variable by the capitalized letter $R$.

In general, each output is a function of all inputs, and not only the state of the input at the present time, but of past time as well, because of vehicles "in storage" during a red signal. Pedestrians ($p$) also play a prominent role, especially for high volumes (or rates). Thus a general symbolic formulation might be:

$$R_i(t) = F_i(\text{all } r, \text{all } p, \text{all } t)$$

where $i$ is any given direction. The form of the functional relationship: $F_i$, depends upon specific behavior permitted and can be expressed in terms of the parameters such as traffic signal operation, waiting, turning, interference, traffic rules, etc. In the above formula $t$ represents time elapsed from an arbitrary reference up until the moment under consideration. This function is best depicted for specific cases. Following are two such cases which differ in the amount and representation of the fine structure of intersection behavior.

Figure 2:
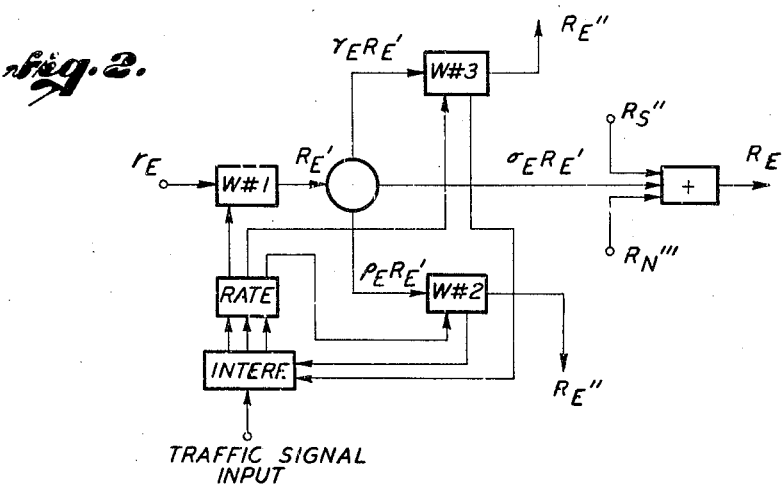
Figure 2 is a diagram showing the functional composition of a street intersection traffic system subdivided into components representing waiting, proportioning and adding.

In this case or model, the functional structure of the system is subdivided into components representing waiting, proportioning, and adding, these in turn to be governed by interference and rate (of leaving). This is depicted by Figure 2.

Vehicles ($r$) arrive at the intersection and enter a storage unit labeled "W#1" (wait). They depart (E) from this first storage unit during a green period at a rate ($R_E'$) determined by the rate generator unit. At this point they enter a turn selector unit wherein a decision is made as to which vehicles are to make the various turns. Those vehicles proceeding straight through the intersection ($\sigma_E R_E'$) have the right-of-way, experience no further interference, and thus continue through the intersection. The vehicles desiring to turn right ($\rho_E R_E'$) may not be able to do so immediately, depending on pedestrian interference. Therefore, these vehicles first enter another storage unit (W#2); they emerge from this unit ($R_E''$) as pedestrian interference permits and also as long as the signal stays green. If right turns on red are to be permitted the traffic signal input to "W#2" is removed and the effect of vehicles coming from the left ($\sigma_S R_S'$) must be accounted for during the red period. Those vehicles desiring to turn left experience similar difficulties to those turning right except that in addition to pedestrian interference, vehicles from the opposing direction ($\sigma_W R_W'$) also hinder left turns. The last unit ($\boxplus$) is to add the contributions from the three directions which together form the total output ($R_E$). In Figure 2, $\gamma_E$, $\sigma_E$, and $\rho_E$ are, in general, random variables which have a value of one for vehicles making the appropriate turns and zero for other vehicles.

Figure 3:
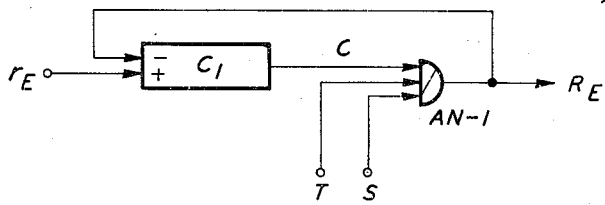
Figure 3 is a circuit diagram representing the portion of a two-lane street intersection traffic system occupied by the cars originally going East.

The basic building block of the intersection is the "waiting" circuit shown in Figure 3. This accounts for the bunching of cars at intersections during periods in which they can not proceed. For convenience, there will be considered only the portion of the intersection occupied by the cars originally going east. In the circuit representing the complete intersection of two streets, there will be four such portions interconnected as shall be shown. The generalization to intersections of more than two streets is immediate.

Pulses representing cars (in Figure 3) arrive from the source $r_E$ and enter the counter $C_1$. The counter illustrated is of a type well known to those skilled in this art, being illustrated by way of example in Arithmetic Operations in Digital Computers, by R. K. Richards, published by Van Nostrand, 1955, chapter VII. If there are any pulses stored in the counter, a signal will appear on the C input to the And-Not gate AN-1. Master timing pulses whose rate equals the reciprocal of the minimum time spacing of vehicles (see postulate (b)) are applied to input T from a pulse generator. These pulses will pass through the gate and leave the intersection via the output $R_E$, provided there is no voltage on the marked terminal S of the gate (i.e., the traffic signal is green). Note that as each pulse is gated through AN-1, it is also fed back and subtracted from those stored in the counter, signifying that one car has passed through the intersection. The intersection may be blocked to traffic flow by applying a voltage to input S. This could correspond, for example, to a red signal in the west-east direction. Thus Figure 3 covers the situation where vehicles are not permitted to turn.

Figure 4:
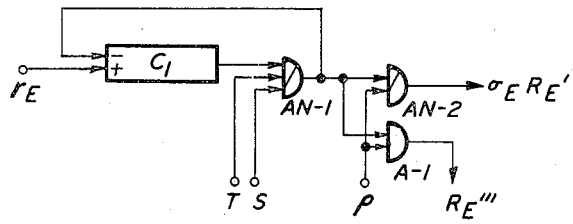
Figure 4 is the diagram of Figure 3 to which has been added a circuit representing the situation in which vehicles may make only right turns and only on green.

In order to represent turns, there is added to Figure 3 a circuit which will decide which cars are to turn and also then decide if they can make the turn. Figure 4 represents the situation in which vehicles may make only right turns and only on a green. In this case there is no coupling between directions of travel and thus no interconnection between the circuits representing the various directions. The operation of Figure 4 is similar to that of Figure 3 up to the output of AN–1. At this point, a decision is made as to whether or not the car represented by a pulse out of AN–1 is to turn right or not. A random decision maker which may be of the type described hereinafter is connected to input $\rho$ to make this decision. If a voltage is present at input $\rho$ then the pulse is gated through A–1 and thence to $R_E'''$ corresponding to a right turn. If no voltage is present, the pulse is gated through AN–2 and proceeds straight through the intersection.

Figure 5:
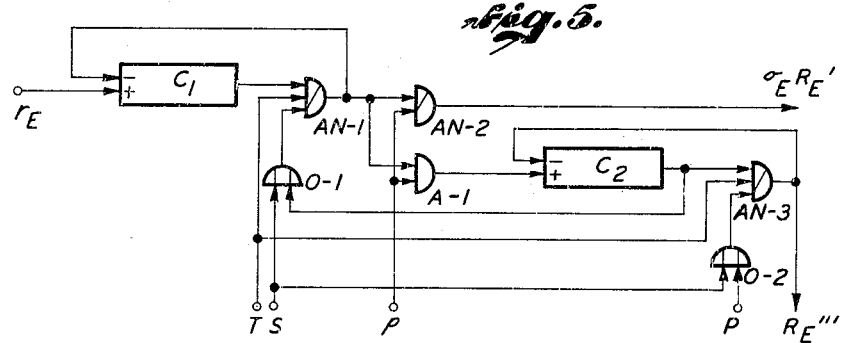
Figure 5 shows the circuit of Figure 4 modified to account for pedestrian interference in the traffic system.

There will now be considered what modifications are necessary to account for pedestrian interference in the situation covered by Figure 4. Figure 5 is the resulting circuit. Input P is energized during periods of pedestrian interference. Thus, if a pulse has been gated through A–1 indicating that a car wishes to turn right, it enters counter $C_2$ and energizes the output of this counter. If input P is energized, signifying that this car can not turn right, the output of the counter remains unaltered. This is due to the fact that no pulse is gated through AN–3 (and subtracted from the count in $C_2$ by means of the feedback loop around AN–3 and $C_2$). Thus a voltage appears on one input to O–2 and therefore also on its output, the marked input of AN–1. This blocks the intersection (in the direction under consideration) just as a red traffic signal would do, since streets with only one lane each way have been assumed. In this case, all cars must stop if the one at the head of the line is stopped. From the above, it is evident that $C_2$ need only have a capacity of one count. The OR gate O–2 is necessary to prevent one car from turning right immediately after red, if it were waiting to turn during the green period but could not do so because of pedestrian interference. To allow the waiting car to turn, it requires merely to omit the (S) input to O–2, thus also eliminating the need for the OR gate O–2.

Pedestrian interference having been accounted for, such interference will be ignored in the remaining sections. Note that the particular type of input at P— random or deterministic, etc.—has not been resolved. This must be decided upon for particular cases on the basis of the data available.

Figure 6:
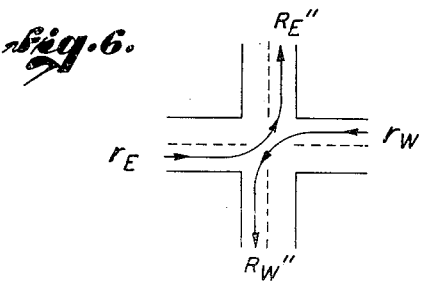
Figure 6 is a diagrammatic illustration of left turns at a street intersection traffic system.

Now consider the matter of left turns. For this, interconnections must exist between the circuits representing opposing directions of travel, for left turns can occur only when oncoming cars permit. It will be postulated that left turns are made as shown in Figure 6. This means that left turns (on green) are allowed without delay unless there are oncoming cars going straight or turning right. The latter implies that the cross street is also two-lane. If not, it is easily accounted for, as will be shown below.

Before proceeding, there will be adopted some notation for the interconnections between the circuits representing the various directions of travel. Inputs to the circuit under consideration coming from one of the other circuits will be denoted by a letter (A, B, etc.) denoting the input and a subscript (N, S, W, etc.) indicating from which other circuit this input is derived. The same notation holds for outputs except for the use of primed letters. Remembering that all diagrams represent only the westerly portion of the intersection, an input marked $A_E$ indicates that this is input A and is derived from the east portion of the intersection. In the east portion there would be an output marked $A_W'$ which would be connected to the above input. Similarly $B_N'$ would indicate that this output is to be connected to the B input of the north portion of the intersection and this input would be marked $B_W$.

Figure 7:
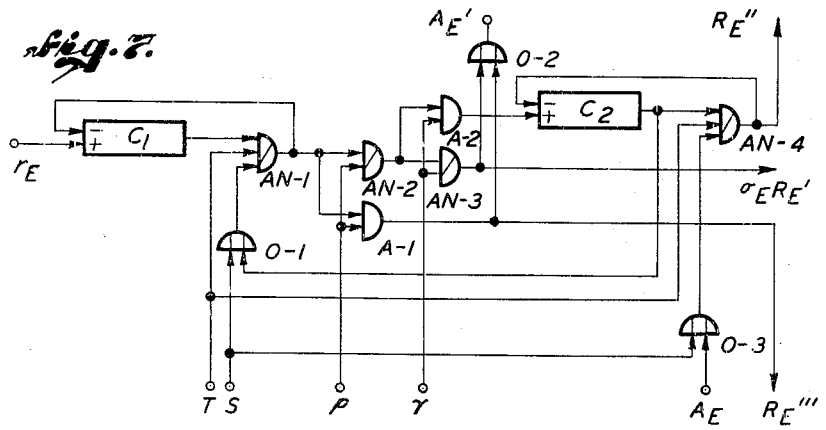
Figure 7 is a circuit diagram representing an intersection traffic system at which left and right turns are permitted on green as shown in Figure 6, and there is no pedestrian interference.

Using the above notation and method of making left turns, Figure 7 is the design of an intersection at which (1) left turns are permitted (only on green), (2) right turns are permitted on green, and (3) there is no pedestrian interference. Input $\gamma$ comes from another decision maker similar to $\rho$, but it decides which of the cars not turning right are to turn left and which are to go straight. The counter $C_2$ is necessary, for if the car at the head of the line is to turn left and cannot do so because of oncoming cars, then the intersection must be blocked via O–1. Input $A_E$ is energized whenever there is a vehicle coming from the east and not turning left. Similar data are available for the east portion of the intersection at output $A_E'$. As before, counter $C_2$ need have a capacity of only one pulse. To let one car turn left immediately after a red signal, provided it was waiting to turn during the green portion, voltage may be removed from the traffic signal input (S) of O–3. This permits elimination of the OR O–3 gate entirely. Remembering that pulse occurrences have been quantized by using master timing pulses separated by the minimum time interval between cars it will be noted that a car may turn left if the oncoming stream of cars has a gap larger than one minimum interval. This is not necessary, for a few additions to the circuit will make this gap any desired multiple of the minimum interval.

The foregoing indicates how one arrives at logical designs representing almost any type of intersection. The description of multi-lane intersections, referred to above, gives the design of an intersection of two two-lane streets at which left turns are permitted (on green) and also right turns on red provided no cars are coming from the left proceeding straight through the intersection. Certain additional complications arise at multi-lane intersections. One of these is the possibility of making lane changes at the intersection. These problems will be covered in the description given later.

Now that the design of intersections has been investigated, there will be discussed the auxiliary or control equipment required for the simulator.

First, a master pulse generator is required for all inputs to intersection components marked (T). This pulse generator will determine the time scale of the simulator and also serve to simplify certain operations. Thus, to determine if a car is present in oncoming lanes, reference is made merely to the times of the occurrence of timing pulses.

Secondly, red and green signal information is required. This voltage can be derived from the timing pulses, as shown in Figure 8 (i.e., Figs. 8a and 8b) where the symbol → $\boxed{n}$ → indicates a device (similar to a counter) which yields one pulse out for every $n$ pulses in. Such devices are known as scaling circuits and in this case the device consists of a scaling circuit with the scale $n$. Such devices are illustrated by way of example in Electronic Engineering, by Samuel Seely, McGraw-Hill, 1956, at pages 301–306. The symbol → $\boxed{FF}$ → indicates a flip-flop which changes state every time a pulse is fed in. If the green portion of the traffic signal is to be $n_1$ minimum time intervals long and the red portion $n_2$, the arrangement of Figure 8(a) is used. If both portions are equal to $n$ minimum intervals the arrangement of Figure 8(b) is used.

To obtain synchronized traffic signal voltages, that is, offset between intersections, the zero or starting positions of the devices $\boxed{n}$ may be set properly. Or the input to the flip-flop, $\boxed{FF}$, of Figure 8 may be delayed by an amount equal to the required offset, and with it drive another flip-flop which generates the traffic signal voltage for the next intersection. The latter method seems to be the most reliable and convenient since delay lines such as those used to represent street sections are already necessary. A circuit for representing traffic actuated signal controllers will be given later.

Finally, there is required a decision maker to provide the inputs labeled ($\rho$) and ($\gamma$). These are derived from noise generators, as shown in Figure 9. A wideband noise generator N is operated such that its output at the time of occurrence of a timing pulse is, for practical purposes, independent of its output at the occurrence of the next timing pulse. This makes vehicles turn independently of each other. The output of this noise generator is then clipped from below at such a level that the probability of being above this level equals the probability of a car making a particular turn at the intersection involved. The result is amplified by a high gain amplifier, and then the top is clipped off at some suitable level. The final result is a train of rectangular pulses of fixed amplitude, random duration and with random gaps between pulses. Furthermore the values of this pulse train at two successive timing pulse occurrences are independent of each other. This, then, is the type of signal required for the decision maker inputs. Theoretically one device such as shown in Figure 9 is required for each of the two types of turns, one for each direction, and one for each intersection. This is required to make the various possible turns at one intersection independent of each other and also independent of the turns at any other intersection. In a large system one decision maker could be used at several intersections spaced a considerable distance apart, since this would not introduce any appreciable error.

The preceding material has described the design of various components of the simulator which represent a network of streets and intersections of arbitrary complexity. All that is now required for a model of traffic flow in this network are some sources of vehicles and possibly some sinks.

Sources for the simulator are simply pulse generators which produce standard pulses in a manner duplicating the entry of vehicles into the system depicted by the simulator. This manner of entry is a matter which must be decided for the particular situation under investigation. It may be purely deterministic or random or a combination of the two. Idealizations may be made or actual data taken in practice may be used (after conversion to the time scale of the simulator). In any event a pulse generator of the proper type is connected to every point of entry of vehicles into the traffic network.

Having established, in effect, a system and an input, whatever output appears must be accommodated. Therefore, traffic sinks are established; these are merely open circuits at the outputs of certain intersection or street components. The pulses at these points are lost, corresponding to cars leaving the depicted area. In certain cases, some measurements on the vehicles leaving the area may be taken by the use of appropriate metering equipment.

As mentioned above, certain metering equipment is necessary if one wishes to determine how near to optimum efficiency the traffic system is operating in relation to a chosen criterion. Certain criteria furnish the basis by which the effectiveness of a traffic flow is judged: what is its figure of merit; how often is it bad?

One figure of merit is the steady-state capacity of the system; that is, for steady-state conditions, the number of cars passing through the system without exceeding a certain level of congestion. To measure this capacity, sources which are of the correct type are connected to the inputs of the system and their mean pulse rate is varied. Congestion may be measured by the number of cars waiting to proceed through each intersection. In particular, warning lights may be energized whenever a counter exceeds a prescribed number, indicating that too many cars were waiting at the intersection. There would be one warning light for each direction of each intersection. One may then arbitrarily say that the capacity of the system has been reached if more than a certain percent of the lights stay on for more than a certain percent of the time. One would begin with a very low rate of entry of cars at each input, and slowly increase the rate until the capacity was exceeded. If certain parameters of the system can be varied then one may arrive at optimum conditions by determining what values of parameters result in the highest "steady-state capacity." These parameters would be such things as traffic signal cycle length, split and offset characteristics, laws governing right and left turns, pedestrian interference, etc. For this figure of merit, the metering equipment consists of a device for measuring the rate of entry of vehicles at each input and a method of determining when congestion is present in the system.

Another figure of merit is related to the time required for a certain number of vehicles to proceed through the depicted area. For example, a given number of pulses are stored in the counters adjacent to each input location. The system is turned on and the time required for a certain percentage of the vehicles to arrive at the outputs is taken as a measure of efficiency of operation of the system. Again, the parameters of the system may be varied to obtain the minimum travel time. Such variable parameters are, by way of example, the length of the traffic light cycle, the split of the traffic light, and the off-set. The length of the traffic light cycle is the time in seconds elapsed from the moment when a traffic light turns red until it again turns red. The split of a traffic light is the ratio of time which a traffic light is red, compared to the time in which it is green. As noted hereinbefore, the amber, or yellow, is regarded as green for the purpose of this invention. The off-set in a given traffic pattern is the time elapsed between the moment when a given intersection turns green and the moment when a next adjacent intersection turns green. Thus, the term off-set has meaning only when specified with relation to two adjacent intersections. These parameters are varied in the well known manner by varying the several inputs to the simulated intersection. For example, in Figure 8a, the split and traffic cycle are determined by varying $n_1$ and $n_2$. In this figure $n_1$ represents a device which receives $n_1$ number of pulses and thereupon delivers at its output a given output pulse. The circuit of $n_1$ is then emptied, ready to receive and store up another quantity of $n_1$ pulses, following which it again delivers a single output pulse. Likewise, the circuit denominated $n_2$ stored up $n_2$ number of pulses before an output pulse. By varying the sum of $n_1$ and $n_2$, the traffic cycle length may be varied, while by varying $n_1$ with respect to $n_2$, the split is varied. Off-set is determined by injecting a predetermined number of pulses into $n_1$ or $n_2$ before the system is started on a run, and in this way an arbitrary controllable phase difference is injected into each of the circuits corresponding to the several intersections, thus producing a desired off-set. Note that the above mentioned percentage should not be taken as 100%. This is because route information concerning individual vehicles is not required, but rather only the statistics of turns at each intersection. It is possible for a certain fraction of the cars to circulate in the model of the system for some time. Sooner or later they will reach the outputs, but the system should not be penalized because vehicles cannot be routed via external controls.

For this figure of merit, the metering equipment would consist of a counter to determine the number of vehicles leaving the system and a timer to measure the time required for the above mentioned percentage of vehicles to reach the outputs. Since the car input into the system is a random function, being derived from a noise generator, several runs are made and a mean or average is struck in order to derive useful information.

Another measure of the efficiency of operation of a traffic system is a weighted sum of the average waiting time per vehicle in each direction of each intersection. The weighted sum arises because some directions at some intersections may be more important than others. It turns out that the measurements required now are a bit more difficult to obtain than for the previous figures of merit. Since "average" waiting time is desired, it is tacitly assumed that the system is in a statistical steady-state. One plug-in device to measure the required quantities at one intersection could be moved among the various intersections to obtain the necessary measurements serially instead of requiring that many devices do this simultaneously. Figure 10 shows such a device. It is necessary to use a special type counter (Kirchhoff adder) whose output is proportional to its count, in order to make the appropriate measurements. A Kirchhoff adder is a digital to analogue counter, i.e., a device which sums up arithmetically the plus and minus pulses applied to the input, and delivers to its output this arithmetic sum as an analogue voltage. Such a device is described by way of example in the above mentioned Arithmetic Operations book at pages 96–98. The output of integrator No. 1 is the total car-seconds delay for the one direction of the intersection under consideration. Integrator No. 1 of Figure 10 is a standard operational integrator which delivers to its output terminal a voltage which is the time integral of the voltage applied to the input terminal. Such a device is illustrated by way of example in Electronic Analogue Computers, by G. A. Korn and T. M. Korn, McGraw-Hill, 1952, at page 194 and page 18 (Fig. 1.14). Integrator No. 2 gives the total number of cars arriving at the intersection from the one direction shown. Integrator No. 2 in Figure 10 is simply a special case of Kerchhoff adder, in that it receives only plus or positive pulses and delivers to its output terminal a voltage which is an analogue representative of the integral of the number of positive pulses applied to the input terminal. For large integration time, this is approximately equal to the number of vehicles passing through the intersection in the direction considered. Thus, the steady-state output of the divider, which divides Integrator No. 1's output by No. 2's output, is the average delay or waiting time per car. The divider of Figure 10 is a standard analogue divider whose output voltage is equal to the quotient of input at $a$ divided by input at $b$. Such a device is illustrated by way of example in the above mentioned Electronic Analogue text at pages 230–233. As before, the parameters of the system are varied to yield a minimum average waiting time per car.

In regard to the time scale of the discrete-variable simulator described above, the rate of operation is set by the master pulse generator connected to each intersection. With present day pulse circuits, this rate could certainly be 10,000 pulses per second or higher. Thus, if the minimum time spacing between vehicles is approximately one second actual time, the time scale of the digital simulator would be over 10,000:1.

Note that the time scale indicated above is conservative as far as present day pulse circuit techniques are concerned but is high enough for most traffic studies. That is, if an actual traffic situation requires, say, 1 hour real time to reach a statistical steady-state, less than 1 second simulator time would be required to duplicate this phenomenon. If results (from the simulator) are to be recorded, the required simulator time would be negligible compared to the recording time and thus there would be no point in having the simulator operate on a faster time scale.

In summary, the logical design given here has been based on certain postulates or idealizations which are felt to be justifiable in situations involving congested traffic conditions but may not be valid in other cases. The input data required for the operation of the simulator consists of information concerning the sources of traffic and the statistics of the various possible turns at each intersection. The parameters of the system which may be varied by the traffic engineer to produce an "optimum" system include such items as traffic signal cycle length, split, and offset, the permissibility of left turns and right turns on red, pedestrian interference, etc.

Figure 11 gives the logical design of one poriton of an intersection of two two-lane streets at which right turns on a red and also left turns (during green) are permitted.

If right turns are to be made on red, one must know if there are any vehicles coming from above (north) going straight through the intersection. If so, they have the right-of-way and therefore right turns must be prevented. This information is obtained from the north circuit and applied to input $B_N$. Similar data are fed to the south circuit from output $B_S'$.

The detailed operation of Figure 11 is as follows. Pulses (cars) arrive at $r_E$ and enter counter $C_1$. Even during a red period for this direction, cars may turn right if they wish to do so and if traffic from the left (north) permits (indicated by no voltage at $B_N$). Thus one pulse is gated through AN–1 (and subtracted from storage $C_1$). If $\rho$ is energized (right turn selector) the car turns right and departs via $R_E'''$. If $\rho$ is not energized, the car is not turning right and therefore enters $C_2$ via AN–2. Now if the signal is red (voltage on S) operations must stop, because the car at the head of the line wishes to either go straight or turn left and can not do so, thus blocking the easterly direction. This is done through O–2. If the signal is green, the pulse is gated through AN–3 (and subtracted from $C_2$) and goes straight through AN–4 (no voltage on $\gamma$) or is to turn left (voltage on $\gamma$) in which case it enters $C_3$. If oncoming cars prevent a left turn ($A_E$ energized) the intersection is blocked through O–1. In this case both $C_2$ and $C_3$ need only a capacity of one pulse. A modification is immediately available by eliminating the S input to O–3 (thus eliminating O–3). This allows one car to make a left turn immediately after the signal turns red, corresponding to the physical situation in which this car is in the intersection and must turn in order to allow cars on the cross street to proceed.

The following is a description of multi-lane intersections referred to above. There will be considered one direction of an intersection in a four-lane (two-lane each way) street where left turns are permitted and also right turns on red. Again pedestrian interference will be neglected. As far as the outside lane goes, no left turns are permitted and for the inside lane, vehicles may not make right turns. This suggests that a circuit similar to Figure 11 (without the left turn section) will be appropriate for the right lane. There is only one difficulty to overcome; the possibility of cars, desiring to go straight, changing lanes provided the one they switch to is vacant at the time.

If such a change of lanes is permitted to occur only from the inside to the outside and only when the inside lane is blocked by a vehicle waiting to make a left turn, there is obtained the result shown in Figure 12. Note that other postulates will result in slightly different or more complex circuits.

That portion representing the outside lane is similar to Figure 11 (without the left turn section) and needs no explanation. The extra storage unit $C_4$, in the inside lane portion is needed to keep track of the number of cars at the head of this line that are to turn left. That is, cars are not allowed to change lanes until it has been decided that they are going straight; if they are to go left, they must be stored somewhere, namely in $C_4$. The output of $C_4$ blocks AN–4 (through A–2 and O–2) unless the other lane is vacant (no output from $C_1$) in which event the cars of $C_3$ may pass through the left-turn selector; those going straight are gated out through AN–5. This whole process is stopped in the event of a red traffic signal (voltage at S).

Two sets of timing pulses have been used at $T_1$ and $T_2$, which have the same rate but are staggered by one half the minimum time separation between vehicles. This allows combining the outputs of each lane to form a single pulse train using O–3. This pulse train is delayed before reaching the next intersection and then must be divided into two pulse trains. This is the purpose of the circuit represented by the symbol (D) at the extreme left of Figure 12. The circuit could, for example, place the incoming pulses alternately in the two lanes or could put a certain percentage of the pulses in each lane. This requires some additional data to decide. Note that this process accounts for possible lane changing in street sections and therefore seems very desirable.

One additional complication arising from the use of staggered timing pulses for the two lanes is that, to determine whether or not a vehicle is coming straight through the intersection from the opposing direction, one cannot just sample the output of the opposing direction at the times of the occurrence of one set of timing pulses. Thus, to determine whether or not a vehicle may make a left turn, which can occur only on timing pulses $T_1$, it must be remembered what happened during the previous interval on timing pulses $T_2$ in the circuit for the opposing direction. This necessitates the use of a oneshot multi-vibrator which has an output for slightly less than one complete cycle after an input pulse. This device is denoted by the symbol →<>→ and must be inserted in the A' output lead of the various portions of the intersection.

As far as right turns on red are concerned, it must first be determined if any cars are proceeding straight through the intersection from the left (north) in the outside lane. These data are fed into input $B_N$ and similar data are available for the south circuit at output $B_S'$. As before, all cars waiting to turn left during a green period may be allowed to do so immediately after the signal turns red, by removing input S from O–4 and thus eliminating the gate entirely. One could also just allow a certain number to make a left turn with a slight modification.

Note that the points marked $X_E^1 \ldots X_E^4$ are required for the operation of the vehicle-actuated controller discussed immediately below.

The need for experimental high-speed vehicle-actuated traffic signal controllers arises in connection with the studies of traffic flow by electronic simulators. The purpose here is to consider the logical design of a discrete-variable model of a compact actuated traffic signal controller, operating at high speed for use with the discrete-variable simulator. This model will incorporate the basic features of a volume-density vehicle-actuated controller in actual use.

The volume-density vehicle-actuated controller operates according to the time variation of the traffic rates of the opposite phases. This signal controller takes into account the following traffic variables:

(a) Number of cars waiting against the red signal,
(b) Length of time waited by the first vehicle arriving against the red signal, and
(c) Instantaneous rate (measured in terms of time gap) of traffic on the phase having the green signal.

The actual functions of these variables on the commercial model are built into the controller with some 28 external parameter adjustment dials. In describing a specific embodiment below, only the logical design part will be considered. The selection of the particular parameters which are to be adjustable will be decided by the engineer who constructs the actual device.

The logical design of a switching circuit performing the basic functions of a volume-density vehicle-actuated controller is shown inside the dotted line box in Figure 13. To conform with the simulator design, the amber periods will be lumped with green in the traffic signal cycle.

Assuming that the unit is operated under traffic-actuated control, the switching circuit operates as follows: Let the traffic control start out with no voltage on phase 2 signal control (designated as green) and voltage on phase 1 signal control (designated as red). Under this condition, if one of the three controlling voltages appears on the corresponding input of the three And gates (A–1, A–2, and A–3), an output voltage immediately appears on phase 2 signal control (turn green to red). This in turn cuts off the voltage on phase 1 signal control (turn red to green). During this half-cycle, A–4, A–5 and A–6 are essentially not in operation. The continuous operation of red on phase 2 signal control now is assured by the disappearance of voltage on phase 1 signal control (through AN–1).

In the second half of the cycle, A–1, A–2 and A–3 are not in operation; the switching of signal between phases 1 and 2 is accomplished by the controlling voltages on A–4, A–5 and A–6 in the same way as the first half cycle. This completes the signal operations for one cycle. The term "signal cycle" here means from green to red and then to green on one phase and red-green-red on the opposite phase. Under traffic-actuated operation, the signal cycle is in general non-periodic.

Figure 13 illustrates application of the present invention to the analysis of a volume-density vehicle-actuated traffic signal controller, such as is described, for example, in Traffic Engineering, volume 23, Number 10, July 1953, pages 339–344. The various controlling voltages to be fed into the switching circuit inside the dotted line box of Figure 13, are obtained by processing information from the traffic sources on the digital simulator through a computing circuit such that the prescribed vehicle-actuated controlling functions are produced. Figure 13 shows a complete logical design of a high-speed digital traffic controller, including both controlling signal processor and switching circuit.

The operation of the controlling signal processor part follows from an understanding of the operation of the components. The electronic circuits involved, such as time, gap measuring counter, and levelers, are described in the published art. The controller has been designed on the basis of intersections of streets with two lanes each way (four-lane total), and the terminals marked (S), (X), (r), etc., correspond to similarly marked ones of Figure 12. Operation of Figure 13 will be obvious from a correlation of the present disclosure with the above mentioned article in Traffic Engineering.

While I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent structures and apparatus.

Having described my invention, what I claim as new and desire to secure by Letters Patent is:

1. Traffic simulator for a traffic intersection comprising: storage means for storing discrete signals and having an add input terminal, a subtract input terminal, and an output terminal, and effective to deliver an output signal at said output terminal in response to relative algebraic summation of discrete add and subtract signals received at the respective corresponding input terminals; traffic controller gating means having at least three gating input terminals and a gating output terminal and effective to deliver a signal at said gating output terminal in dependence upon the existence of a predetermined input signal conditions at said gating input terminals; means for applying a signal to one of said gating input terminals representing a given condition of an intersection traffic controller; means for applying to a second of said gating input terminals a succession of discrete signals at a rate proportional to a simulated average rate of passage of vehicles; means for applying to a third of said gating input terminals the output signal from said storage means; and the means for feeding back the output from said gating means to said subtract input terminal of said storage means.

2. Traffic simulator in accordance with claim 1 comprising in addition a pair of turn gating means, each having two input terminals and an output terminal, each turn gating means being effective to deliver a signal at its output terminal in dependence upon the existence of predetermined input signal conditions at its said two input terminals, means for applying the output from said traffic controller gating means to respective input terminals of said two turn gating means, and means for applying to the respective other input terminals of said two turn gating means a gating signal for enabling one of said turn gating means while simultaneously disabling the other of said turn gating means and vice versa; the respective output terminals of said two turn gating means representing division of vehicles into two separate directions of travel.

3. Traffic simulator in accordance with claim 2 comprising in addition second storage means for storing signals and having an add input terminal, a subtract input terminal, and an output terminal, said second storage means being effective to deliver an output signal at its output terminal in response to relative algebraic summation of add and subtract signals received at its corresponding said input terminals; means for connecting the output of one of said turn gating means to the add input terminal of said second storage means; blocked turn gating means having at least two gating input terminals and a gating output terminal, said blocked turn gating means being effective to deliver a signal at its output terminal in dependence upon the existence of predetermined input signal conditions at its input terminals; means for applying to one input terminal of said blocked turn gating means the output signal from said second storage means; means for applying to another input terminal of said blocked turn gating means a signal proportional to the simulated average rate of vehicle passage; and means for applying the output from said blocked turn gating means back to said subtract input terminal of said second storage means.

4. Traffic simulator for representing a traffic intersection comprising storage means for storing signals and having an add input terminal, a subtract input terminal, and an output terminal, and effective to deliver an output signal at said output terminal in response to relative algebraic summation of add and subtract signals received at the respective corresponding input terminals, gating means having three gating input terminals and a gating output terminal, and effective to deliver a signal at said gating output terminal in dependence upon the existence of predetermined input signal conditions at said gating input terminals, means for applying a signal to one of said gating input terminals representing a given condition of an intersection traffic controller, means for applying to another said gating input terminal a signal proportional to a simulated average rate of passage of vehicles, means for applying to a third of said gating input terminals the output signal from said storage means, and means for feeding back the output from said gating means to said subtract terminal input of said storage means.

5. Traffic simulator for a traffic intersection comprising: first storage means for storing signals and having input and output; means for applying to said input of said first storage means a signal representing the approach of vehicles to the intersection; turn means for distributing signals received into one of three channel outputs representing left-turning vehicles, straight-through vehicles, and right-turning vehicles, respectively, and having correspondingly an input terminal and three output terminals; means for applying the output of said first storage means to said turn means; means for releasing signals from said first storage means in accordance with traffic control parameters; and means for controlling distribution of signals by said turn means in accordance with a controllable determinant, for determining what percentage of vehicles are to follow the respective three channels out of said turn means.

6. Simulator in accordance with claim 5, including second storage means for storing signals representing left-turns; third storage means for storing signals representing right turns; means for applying the left turn output of said turn means to the input of said second storage means; means for applying the right turn output of said turn means to said third storage means; means for releasing signals from said second storage in accordance with circuit parameters permitting the making of left turns; and means for releasing signals stored in said third storage means in accordance with parameters representing the permitting of right turns.

7. Simulator in accordance with claim 6, including combining means for receiving and combining signals from the straight through output of said turn means with signals from other simulators of the intersection, thereby to create the aggregate of all traffic leaving the intersection in a straight-through direction.

8. Traffic simulator for a traffic intersection comprising: storage means for storing signals and having input and output; means for applying to said input of said storage means a signal representing the rate of approach of vehicles to the intersection; turn means for distributing signals received, into one of at least two channels representing respective two directions of traffic leaving the intersection, and having correspondingly an input terminal and at least two output terminals representing said two channels respectively; means for applying the output of said storage means to the input terminal of said turn means; means for releasing signals from said storage means in accordance with traffic control parameters, and means for controlling distribution of signals by said turn means in accordance with a controllable determinant for determining the percentage of vehicles to follow the respective said two channels out of said turn means.

References Cited in the file of this patent

UNITED STATES PATENTS

| | | |
|---|---|---|
| 1,394,008 | Hargreaves | Oct. 18, 1921 |
| 2,525,496 | McCann | Oct. 10, 1950 |
| 2,695,750 | Kayan | Nov. 30, 1954 |
| 2,712,184 | Ziebolz et al. | July 5, 1955 |
| 2,712,414 | Ziebolz et al. | July 5, 1955 |
| 2,796,218 | Toothill et al. | June 18, 1957 |
| 2,808,986 | Stone et al. | Oct. 8, 1957 |